United States Patent
Matsubara

(10) Patent No.: US 9,645,623 B2
(45) Date of Patent: May 9, 2017

(54) SEMICONDUCTOR INTEGRATED CIRCUIT AND METHOD OF CONTROLLING POWER SUPPLY

(71) Applicant: FUJITSU LIMITED, Kawasaki-shi, Kanagawa (JP)

(72) Inventor: Satoshi Matsubara, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 536 days.

(21) Appl. No.: 14/243,876

(22) Filed: Apr. 2, 2014

(65) Prior Publication Data

US 2014/0300191 A1    Oct. 9, 2014

(30) Foreign Application Priority Data

Apr. 3, 2013  (JP) ................. 2013-077833

(51) Int. Cl.
*H01L 27/00*  (2006.01)
*G06F 1/26*  (2006.01)

(52) U.S. Cl.
CPC ............. *G06F 1/26* (2013.01); *Y10T 307/50* (2015.04)

(58) Field of Classification Search
CPC .................... H01L 27/00; G06F 1/26
USPC ........................................ 307/43
See application file for complete search history.

(56) References Cited

U.S. PATENT DOCUMENTS

| | | | |
|---|---|---|---|
| 2006/0244512 A1 | 11/2006 | Fung et al. | |
| 2008/0211979 A1* | 9/2008 | Tonomura | H02M 3/07 349/33 |
| 2008/0231349 A1 | 9/2008 | Naitou | |
| 2012/0274146 A1* | 11/2012 | Laur | H02M 3/33561 307/82 |

FOREIGN PATENT DOCUMENTS

| | | |
|---|---|---|
| JP | 06-084357 | 3/1994 |
| JP | 11-219586 | 8/1999 |
| JP | 2008-234195 | 10/2008 |

OTHER PUBLICATIONS

JPOA—Office Action mailed on Oct. 4, 2016 issued with respect to the basic Japanese Patent Application No. 2013-077833, with partial English translation.

* cited by examiner

*Primary Examiner* — Joseph Chang
(74) *Attorney, Agent, or Firm* — Fujitsu Patent Center

(57) ABSTRACT

A semiconductor integrated circuit includes a digital circuit configured to receive a first power supply to operate in synchronization with a clock signal, and an electric-charge supplying circuit configured to supply electric charge from a second power supply to the digital circuit in synchronization with the clock signal.

10 Claims, 15 Drawing Sheets

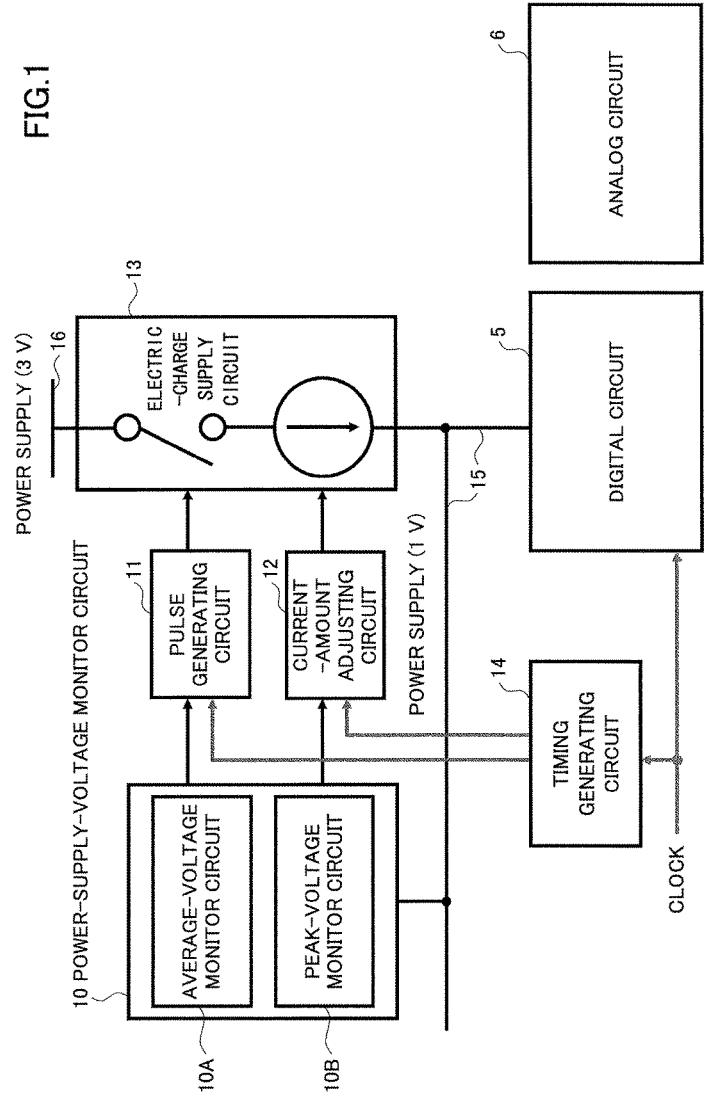

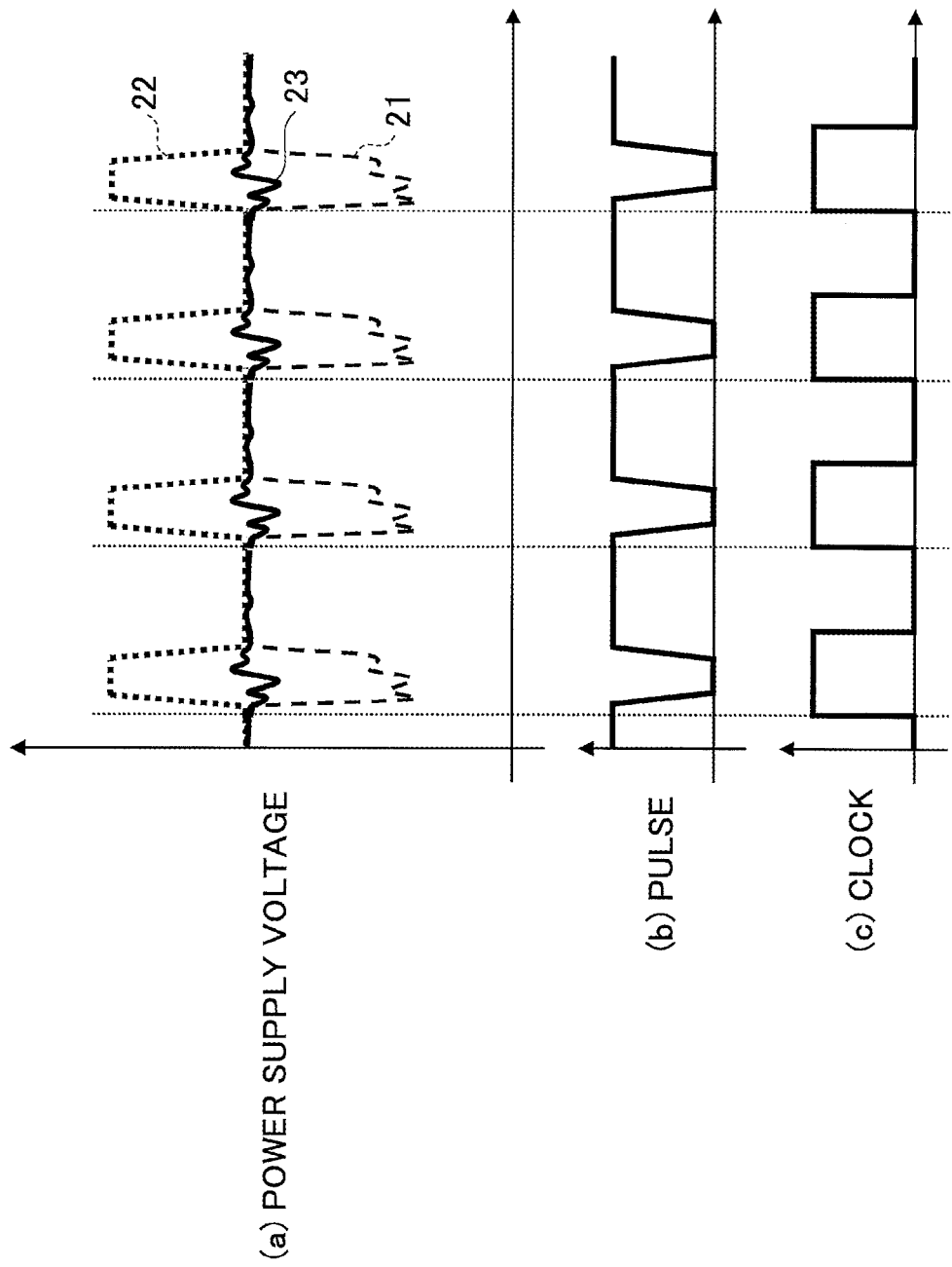

SEMICONDUCTOR INTEGRATED CIRCUIT AND METHOD OF CONTROLLING POWER SUPPLY

CROSS-REFERENCE TO RELATED APPLICATIONS

The present application is based upon and claims the benefit of priority from the prior Japanese Patent Application No. 2013-077833 filed on Apr. 3, 2013, with the Japanese Patent Office, the entire contents of which are incorporated herein by reference.

FIELD

The disclosures herein relate to a semiconductor integrated circuit and a method of controlling power supply in the semiconductor integrated circuit.

BACKGROUND

Along with an increase in the functionality of an LSI (i.e., large scale integrated circuit), there has been an increasing number of mixed-signal LSIs that are provided with both an analog circuit and a digital circuit. In a digital circuit, a number of circuit parts operate in synchronization with a clock signal. Because of this, a large-scale circuit consumes a large electric current at the transition of a clock signal, thereby creating an IR drop in the power supply voltage and the ground voltage. Such an IR drop includes high frequency components that are in synchronization with the clock frequency, and, thus, a power-supply bypass condenser or the like provided in the LSI may not produce a sufficient suppressive effect. An IR drop adversely affects the characteristics of an analog circuit and the timing margin of a digital circuit.

A technology for compensating for an IR drop includes a method of introducing different skews in clock signal lines that are laid out in a digital circuit. With this arrangement, these skews serve to distribute peaks of electric-current consumption that are in synchronization with the clock signal, thereby improving the worst value of an IR drop. However, the fact that the IR drop causes a drop in the power-supply voltage remains to be true, and drastic improvements cannot be obtained in the analog characteristics or in the timing margins.

There is another method for improving an IR drop, which utilizes enable signals provided for controlling whether logic circuits in the digital circuit operate or do not operate, so that the amount of electric current supplied from the power-supply circuit is adjusted according to the enable signals. This method serves to stabilize the power-supply-voltage fluctuation that is created at the start or end of an operation of a logic circuit, but cannot cope with an IR drop that contains high frequency components synchronized with a clock signal frequency.

[Patent Document 1] Japanese Laid-open Patent Publication No. 6-84357
[Patent Document 2] Japanese Laid-open Patent Publication No. 11-219586

SUMMARY

According to an aspect of the embodiment, a semiconductor integrated circuit includes a digital circuit configured to receive a first power supply to operate in synchronization with a clock signal, and an electric-charge supplying circuit configured to supply electric charge from a second power supply to the digital circuit in synchronization with the clock signal.

According to an aspect of the embodiment, a method of controlling power supply for a semiconductor integrated circuit includes causing a digital circuit receiving a first power supply to operate in synchronization with a clock signal, and supplying electric charge from a second power supply to the digital circuit in synchronization with the clock signal.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 1 is a drawing illustrating an example of the configuration of a semiconductor integrated circuit;

FIG. 2 is a drawing illustrating how an IR drop is suppressed by the supply of electric charge from an electric-charge supply circuit;

DESCRIPTION OF EMBODIMENTS

Figure 3A:
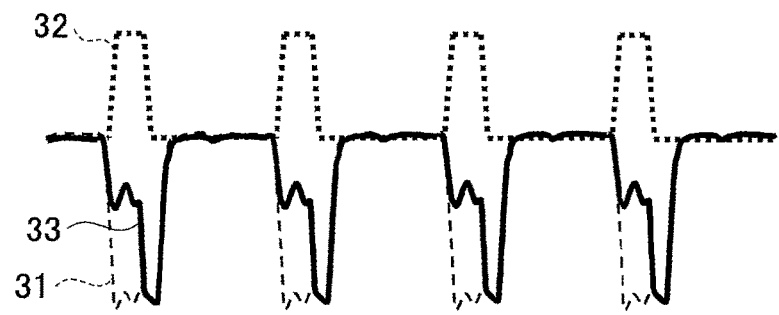
FIGS. 3A through 3C are drawings illustrating adjustment of pulse width by a pulse generating circuit.

In the following, embodiments of the invention will be described with reference to the accompanying drawings.

FIG. 1 is a drawing illustrating an example of the configuration of a semiconductor integrated circuit. The semiconductor integrated circuit illustrated in FIG. 1 includes a power-supply-voltage monitor circuit 10, a pulse generating circuit 11, a current-amount adjusting circuit 12, an electric-charge supply circuit 13, a timing generating circuit 14, a first power supply line 15, a second power supply line 16, a digital circuit 5, and an analog circuit 6. The semiconductor integrated circuit illustrated in FIG. 1 has both a digital circuit and an analog circuit implemented on a single semiconductor substrate. In FIG. 1 and the subsequent drawings, boundaries between circuit blocks illustrated as boxes basically indicate functional boundaries, and may not correspond to separation in terms of physical positions, separation in terms of electrical signals, separation in terms of control logic, etc. Each circuit block may be a hardware module that is physically separated from other blocks to some extent, or may indicate a function in a hardware module in which this and other blocks are physically combined together.

The digital circuit 5 receives a first power supply (e.g., a power supply voltage of 1 V) from the first power supply line 15, and operates in synchronization with a clock signal. The digital circuit 5 has a number of circuit parts that operate in synchronization with the clock signal, and thus consumes a large electric current at the transitions of the clock signal. The use of only the first power supply ends up resulting in an IR drop being created in the power supply voltage (i.e., the voltage on the first power supply line 15) and/or in the ground voltage. Such an IR drop adversely affects the characteristics of the analog circuit 6 and the timing margin of the digital circuit 5, thereby causing circuit malfunction. It may be noted that the analog circuit 6 is implemented on the same substrate as the digital circuit 5, and, thus, is affected by fluctuation in the power-supply voltage and/or the ground voltage caused by the digital circuit 5.

In order to reduce the IR drop, the electric-charge supply circuit 13 supplies electric charge from a second power supply (e.g., a power supply voltage of 3 V) to the digital circuit 5 through the second power supply line 16 in synchronization with the clock signal. Specifically, the electric-charge supply circuit 13 supplies a desired amount of electric current from the second power supply to the digital circuit 5 in synchronization with the clock signal for the duration of a desired time length. The second power supply voltage may be higher than the first power supply voltage. To be more specific, the voltage that can be supplied from the second power supply to the first power supply line 15 by taking into account a voltage drop across the electric-charge supply circuit 13 may preferably be equal to or higher than the first power supply voltage.

As was previously described, an IR drop is generated in the first power supply line 15 due to the fact that the digital circuit 5 consumes electric current in synchronization with the clock signal, thereby lowers the voltage applied from the first power supply to the digital circuit 5. Because of this, a signal line that is supposed to be raised to HIGH inside the digital circuit 5 does not exhibit a sufficiently rapid voltage rise to HIGH due to the insufficiency of electric charge. In consideration of this, provision is made such that electric current is supplied from the second power supply to the digital circuit 5 through the electric-charge supply circuit at the same time as current consumption, thereby supplementing electric charge that becomes insufficient in the digital circuit 5. In other words, the second power supply is connected to the first power supply line 15 at the time the voltage of the first power supply line 15 is lowered due to an IR drop, thereby raising the voltage of the first power supply line 15. With this arrangement, the voltage of the first power supply line 15 ideally returns to a desired voltage level (i.e., 1 V) to eliminate an effect on the timing margin of the digital circuit 5. Further, an effect on the characteristics of the analog circuit 6 is also eliminated.

The first power supply line 15 serves to supply the first power supply to the digital circuit 5 as well as to supply electric charge from the second power supply to the digital circuit 5. As was previously described, the electric-charge supply circuit 13 supplies a desired amount of electric current from the second power supply to the digital circuit 5 in synchronization with the clock signal for the duration of a desired time length. The desired amount of electric current and the desired time length are adjusted based on the result of detecting the voltage fluctuation of the first power supply line 15.

The power-supply-voltage monitor circuit 10 outputs the results of detecting voltage fluctuation on the first power supply line 15. The current-amount adjusting circuit 12 generates a signal having a signal value that varies in response to the detection results output from the power-supply-voltage monitor circuit 10. This signal may be a code signal representing a signal value in a digital format. The pulse generating circuit 11 produces, in synchronization with the clock signal, a pulse having a pulse width that varies in response to the detection results output from the power-supply-voltage monitor circuit 10. The timing generating circuit 14 produces, based on the clock signal, timing signals that are used by the pulse generating circuit 11 and the current-amount adjusting circuit 12 to operate. The generated timing signals are supplied to the pulse generating circuit 11 and the current-amount adjusting circuit 12.

Based on the signal from the current-amount adjusting circuit 12 and the pulse from the pulse generating circuit 11, the electric-charge supply circuit 13 supplies a desired amount of electric current to the digital circuit 5 from the second power supply for the duration of a desired time length, the desired amount being responsive to the signal value and the desired time length being responsive to the pulse width. With this arrangement, the digital circuit 5 receives electric charge the amount of which is equivalent to the amount of electric charge that is lost by an IR drop caused by electric-current consumption in the digital circuit 5, and such electric charge is supplied for the duration of a time length equal to the period of the IR drop caused by electric-current consumption in the digital circuit 5.

The power-supply-voltage monitor circuit 10 includes an average-voltage monitor circuit 10A and a peak-voltage monitor circuit 10B. The average-voltage monitor circuit 10A detects an average of the voltage of the first power supply line 15, and outputs the detected voltage as a detection result. The peak-voltage monitor circuit 10B detects an upper-side peak voltage of the voltage of the first power supply line 15 and a lower-side peak voltage of the voltage of the first power supply line 15, and outputs the detected voltages as detection results.

FIG. 2 is a drawing illustrating how an IR drop is suppressed by the supply of electric charge from the electric-charge supply circuit 13. In FIG. 2, the horizontal axis represents time, and the vertical axis represents voltage. FIG. 2-(a) illustrates power supply voltage (i.e., the voltage of the first power supply line 15). FIG. 2-(b) illustrates pulses output by the pulse generating circuit 11. FIG. 2-(c) illustrates the clock signal. A voltage waveform of the first power supply line 15 illustrates an IR drop waveform observed when no electric charge is provided by the electric-charge supply circuit 13. As illustrated in FIG. 2-(a) and FIG. 2-(c), IR drops occur immediately after the rising transitions of the clock signal.

In the pulse signal illustrated in FIG. 2-(b), the LOW periods are the pulse periods of interest. Namely, the pulse width of a LOW pulse generated by the pulse generating circuit 11 defines the period of electric charge supply (i.e., period of electric current supply) by the electric-charge supply circuit 13. A voltage waveform 22 illustrated in FIG. 2-(a) illustrates the amount of voltage rise that is added to the voltage of the first power supply line 15 and that is caused by electric charge supplied from the electric-charge supply circuit 13 for the duration of the LOW pulses generated by the pulse generating circuit 11. Further, a voltage waveform 23 is the result of adding the voltage waveform 22 to the voltage waveform 21. The voltage waveform 23 illustrates the voltage of the first power supply line 15 after the IR drops are reduced by electric charge supplied from the electric-charge supply circuit 13. In this manner, the supply of electric charge by the electric-charge supply circuit 13 can reduce an IR drop.

Figure 3B:
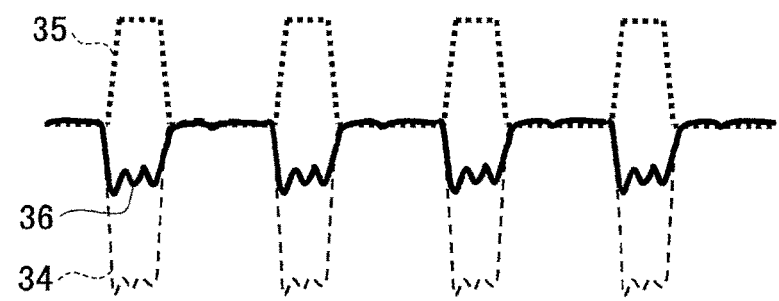
Figure 3C:
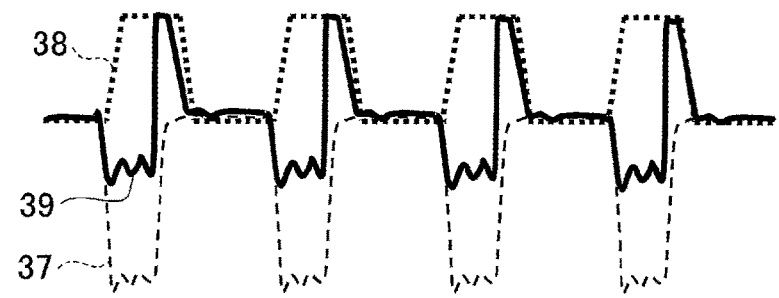

FIGS. 3A through 3C are drawings illustrating adjustment of pulse width by the pulse generating circuit 11. The pulse generating circuit 11 adjusts pulse width so as to adjust the period of electric-charge supply (i.e., period of electric-current supply) performed by the electric-charge supply circuit 13. In FIGS. 3A through 3C, the horizontal axis represents time, and the vertical axis represents voltage. Each waveform illustrates the voltage of the first power supply line 15.

In FIG. 3A, a voltage waveform 31 illustrates an IR drop waveform observed when no electric charge is provided by the electric-charge supply circuit 13. A voltage waveform 32 illustrates the amount of voltage rise that is added to the voltage of the first power supply line 15 and that is caused by electric charge supplied from the electric-charge supply circuit 13 for the duration of the LOW pulses generated by the pulse generating circuit 11. Further, a voltage waveform 33 is the result of adding the voltage waveform 32 to the voltage waveform 31. The voltage waveform 23 illustrates the voltage of the first power supply line 15 after electric charge is supplied from the electric-charge supply circuit 13. In the state illustrated in FIG. 3A, the period of electric-charge supply performed by the electric-charge supply circuit 13 (i.e., the period of a LOW pulse produced by the pulse generating circuit 11) is too short, so that there is a leftover pulse (i.e., negative pulse) having an amplitude equal to the amount of voltage drop caused by an IR drop. In this case, when an upper-side peak voltage and an average voltage are detected with respect to the first power supply line 15, the upper-side peak voltage is slightly higher than the average voltage.

In FIG. 3C, a voltage waveform 37 illustrates an IR drop waveform observed when no electric charge is provided by the electric-charge supply circuit 13. A voltage waveform 38 illustrates the amount of voltage rise that is added to the voltage of the first power supply line 15 and that is caused by electric charge supplied from the electric-charge supply circuit 13 for the duration of the LOW pulses generated by the pulse generating circuit 11. Further, a voltage waveform 39 is the result of adding the voltage waveform 38 to the voltage waveform 37. The voltage waveform 39 illustrates the voltage of the first power supply line 15 after electric charge is supplied from the electric-charge supply circuit 13. In the state illustrated in FIG. 3C, the period of electric-charge supply performed by the electric-charge supply circuit 13 (i.e., the period of a LOW pulse produced by the pulse generating circuit 11) is too long, so that the end of an IR drop is followed by the occurrence of a pulse (i.e., positive pulse) having an amplitude equal to the amount of voltage rise caused by the supply of electric charge. In this case, when an upper-side peak voltage and an average voltage are detected with respect to the first power supply line 15, the upper-side peak voltage is significantly higher than the average voltage.

In FIG. 3B, a voltage waveform 34 illustrates an IR drop waveform observed when no electric charge is provided by the electric-charge supply circuit 13. A voltage waveform 35 illustrates the amount of voltage rise that is added to the voltage of the first power supply line 15 and that is caused by electric charge supplied from the electric-charge supply circuit 13 for the duration of the LOW pulses generated by the pulse generating circuit 11. Further, a voltage waveform 36 is the result of adding the voltage waveform 35 to the voltage waveform 34. The voltage waveform 36 illustrates the voltage of the first power supply line 15 after electric charge is supplied from the electric-charge supply circuit 13. In the state illustrated in FIG. 3B, the period of electric-charge supply performed by the electric-charge supply circuit 13 (i.e., the period of a LOW pulse produced by the pulse generating circuit 11) is substantially the same length as the period of an IR drop, so that there is neither a leftover pulse nor an excess pulse. In this case, when an upper-side peak voltage and an average voltage are detected with respect to the first power supply line 15, the upper-side peak voltage and the average voltage have almost no difference.

As described above, a difference between the upper-side peak voltage and the average voltage varies depending on whether the period of electric-charge supply is too short, too long, or about a right length. The period of electric-charge supply is set to a proper time length by the pulse generating circuit 11 illustrated in FIG. 1 when the pulse generating circuit 11 changes the pulse width of pulses in response to the difference between the upper-side peak voltage and the average voltage. Specifically, provision may be made such that the pulse width is deceased when the upper-side peak voltage is higher than the average voltage plus a certain margin $\Delta V$, and is increased otherwise.

Figure 4A:
FIGS. 4A through 4C are drawings for explaining adjustment of electric current performed by a current-amount adjusting circuit.
Figure 4B:
Figure 4C:

FIGS. 4A through 4C are drawings for explaining adjustment of electric current performed by the current-amount adjusting circuit 12. The current-amount adjusting circuit 12 adjusts the amount of electric current, so that the amount of electric charge (or the amount of electric current) supplied by the electric-charge supply circuit 13 is adjusted. In FIGS. 4A through 4C, the horizontal axis represents time, and the vertical axis represents voltage. Each waveform illustrates the voltage of the first power supply line 15 after the supply of electric current (i.e., after the attempt to reduce IR drops).

In the voltage waveform observed after the attempt to reduce IR drops illustrated in FIG. 4A, positive pulses appear in the voltage of the first power supply line 15 because of the supply of excessive electric charge. In this case, a middle voltage between the upper-side peak voltage and the lower-side peak voltage is higher than the average voltage.

In the voltage waveform observed after the attempt to reduce IR drops illustrated in FIG. 4C, negative leftover pulses appear in the voltage of the first power supply line 15 because of the supply of insufficient electric charge. In this case, a middle voltage between the upper-side peak voltage and the lower-side peak voltage is lower than the average voltage.

In the voltage waveform observed after the attempt to reduce IR drops illustrated in FIG. 4B, the voltage of the first power supply line 15 exhibits an almost flat waveform (i.e., almost no fluctuation) because of the supply of right amount of electric charge. In this case, a middle voltage between the upper-side peak voltage and the lower-side peak voltage is substantially the same as the average voltage.

As described above, the high or low relationship between the average voltage and the middle voltage between the upper-side peak voltage and the lower-side peak voltage varies depending on whether the amount of electric-charge supply is excessive, insufficient, or about the right amount. Accordingly, the amount of supplied electric charge is set to an appropriate amount by the current-amount adjusting circuit 12 illustrated in FIG. 1 when the current-amount adjusting circuit 12 changes the signal value of the output signal in response to the high or low relationship between the average voltage and the middle voltage between the upper-side peak voltage and the lower-side peak voltage. The amount of supplied electric charge is decreased when the middle voltage between the upper-side peak voltage and the lower-side peak voltage is higher than the average voltage, and is increased when the middle voltage between the upper-side peak voltage and the lower-side peak voltage is lower than the average voltage.

Figure 5:
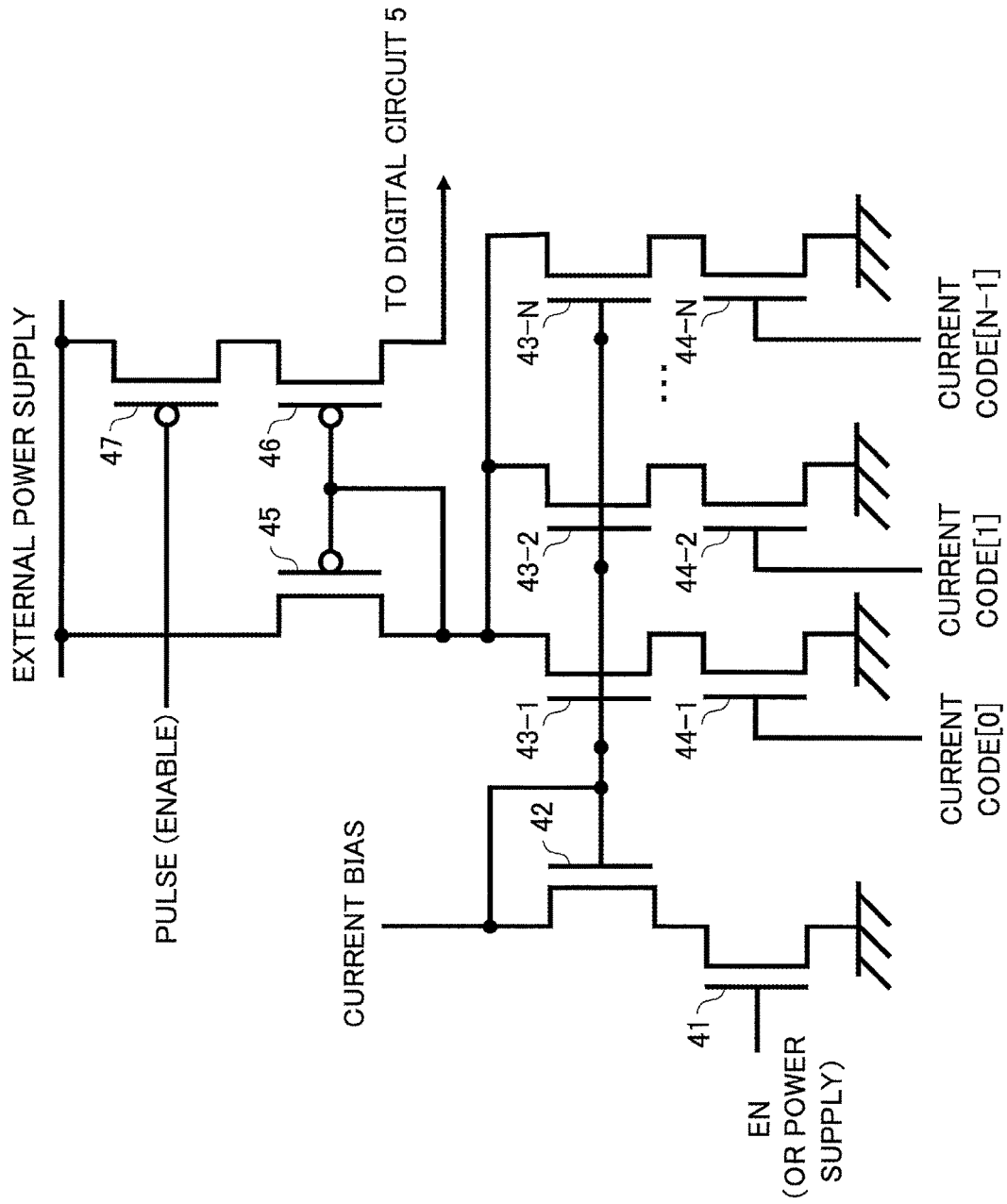
FIG. 5 is a drawing illustrating an example of the configuration of the electric-charge supply circuit.

FIG. 5 is a drawing illustrating an example of the configuration of the electric-charge supply circuit 13. The electric-charge supply circuit 13 illustrated in FIG. 5 includes NMOS transistors 41 and 42, NMOS transistors 43-1 through 43-N, NMOS transistors 44-1 through 44-N, and PMOS transistors 45 through 47. The NMOS transistors 41 and 42 have a predetermined amount of electric current flowing therethrough as a current bias. The NMOS transistor 42 and the NMOS transistors 43-1 through 43-N are arranged to form current-mirror circuits. An electric current whose amount is responsive to the amount of electric current of the current bias that flows through the NMOS transistor 42 flows through any given one of the NMOS transistors 43-1 through 43-N. For example, the size of the NMOS transistor 42 may be the same as the size of the NMOS transistor 43-1. In such a case, an electric current whose amount is equal to the amount of the current bias that flows through the NMOS transistor 42 flows through the NMOS transistor 43-1. If the size is twice as large, the amount of electric current that flows is twice as large. If the size is four times as large, the amount of electric current that flows is four times as large.

The gates of the NMOS transistors 44-1 through 44-N receive N electric-current code bits, respectively. The sizes of the NMOS transistors 43-1 through 43-N, which are series-connected to the NMOS transistors 44-1 through 44-N, respectively, may be set to the same size, twice as large as, four times as large as, . . . , $2^N$ times as large as the size of the NMOS transistor 42, respectively. In this case, the total amount of electric currents flowing through the NMOS transistors 43-1 through 43-N corresponds to the value of a binary number that is represented by the above-noted N electric-current code bits.

This total amount of electric current also flows through the PMOS transistor 45, and an electric current whose amount is equal to this current amount also flows through the PMOS transistor 46. With this arrangement, an electric current whose amount is specified by the N electric-current code bits is supplied from the PMOS transistor 46 to the digital circuit 5 through the first power supply line 15. It may be noted that the gate of the PMOS transistor 47 that is series-connected to the PMOS transistor 46 receives pulses supplied from the pulse generating circuit 11. In response to these pulses, the PMOS transistor 47 alternates between the conductive state and the nonconductive state in synchronization with the clock signal.

Figure 6:
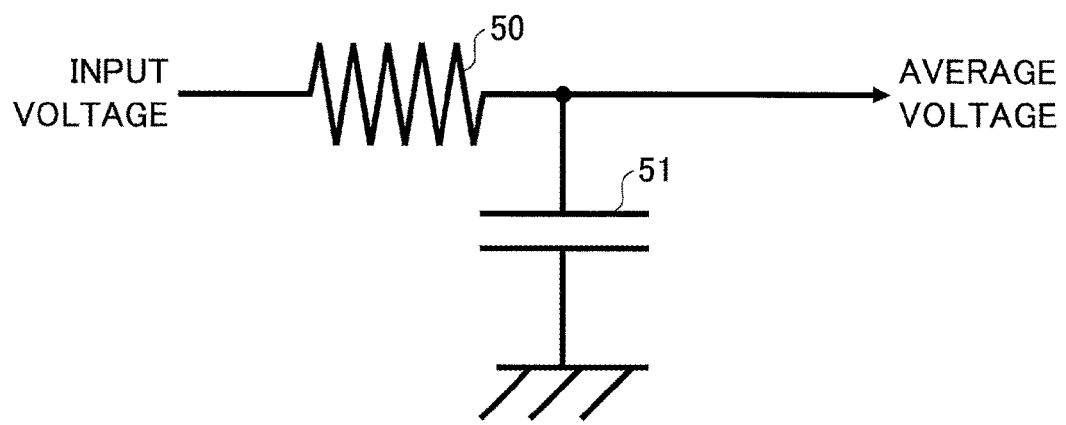
FIG. 6 is a drawing illustrating an example of the configuration of an average-voltage monitor circuit.

FIG. 6 is a drawing illustrating an example of the configuration of the average-voltage monitor circuit 10A. The average-voltage monitor circuit 10A illustrated in FIG. 6 includes a resistive element 50 and a capacitive element 51. Electric charge is accumulated in the capacitive element 51 through the resistive element 50 when the voltage of the first power supply line 15 illustrated in FIG. 1 is supplied as an input voltage. An averaging effect by the capacitive element 51 serves to remove fine voltage fluctuation, resulting in an average of the input power supply voltage being output.

Figure 7:
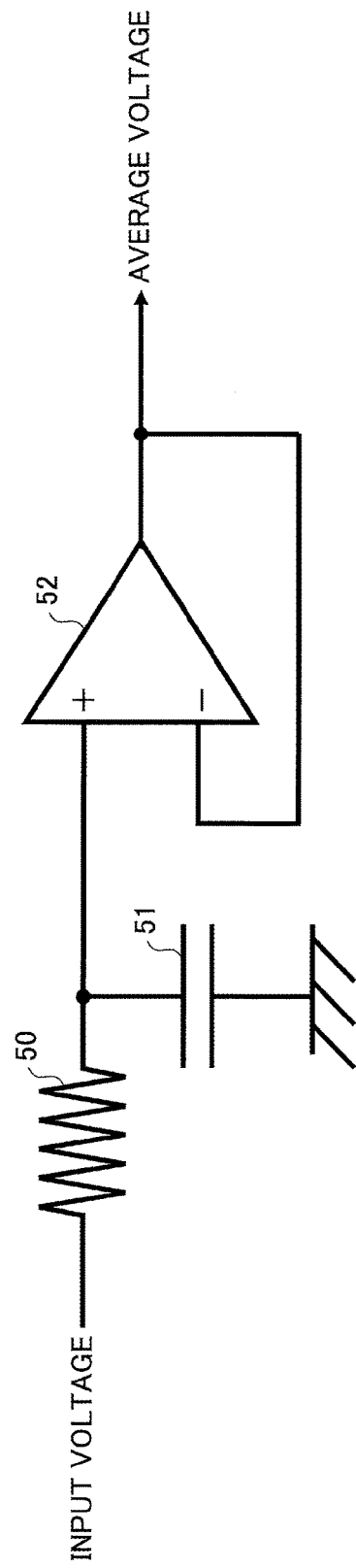
FIG. 7 is a drawing illustrating another example of the configuration of the average-voltage monitor circuit.

FIG. 7 is a drawing illustrating another example of the configuration of the average-voltage monitor circuit 10A. In FIG. 7, the same or corresponding elements as those of FIG. 6 are referred to by the same or corresponding numerals, and a description thereof will be omitted as appropriate. The average-voltage monitor circuit 10A illustrated in FIG. 7 includes an operational amplifier 52 in addition to the resistive element 50 and the capacitive element 51. The operational amplifier 52 is used as a voltage follower. With this arrangement, an average voltage of the input voltage is properly detected without being influenced by the input impedance of the next stage circuit to which the average voltage is supplied.

Figure 8:
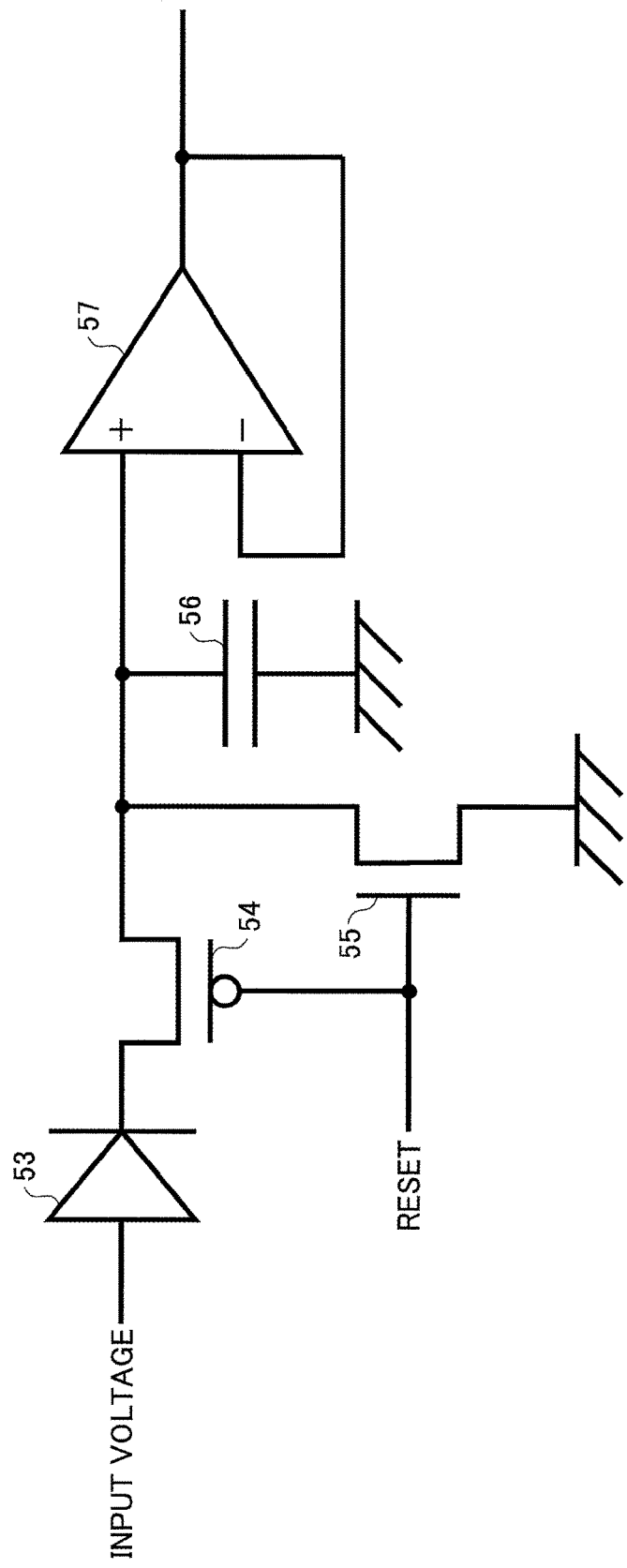
FIG. 8 is a drawing illustrating an example of the configuration of an upper-side peak detecting part of the peak-voltage monitor circuit.

FIG. 8 is a drawing illustrating an example of the configuration of an upper-side peak detecting part of the peak-voltage monitor circuit 10B. The circuit illustrated in FIG. 8 includes a diode 53, a PMOS transistor 54, an NMOS transistor 55, a capacitive element 56, and an operational amplifier 57. Electric charge is accumulated in the capacitive element 56 through the diode 53 and the PMOS transistor 54 when the voltage of the first power supply line 15 illustrated in FIG. 1 is supplied as an input voltage. When the input voltage is lower than the voltage across the capacitive element 56 plus the threshold voltage of the diode 53, the voltage between the nodes of the capacitive element remains unchanged. When the input voltage is higher than the voltage across the capacitive element 56 plus the threshold voltage of the diode 53, the capacitive element 56 is charged up to a voltage responsive to the input voltage. With this arrangement, the capacitive element 56 holds a voltage responsive to the upper-side peak voltage (upper-limit voltage) of the input voltage. It may be noted that a reset signal may be set to HIGH to completely discharge the capacitive element 56 through the NMOS transistor 55, thereby performing initialization. Further, the use of the operational amplifier 57 as a voltage follower allows the upper-side peak voltage to be properly detected without being influenced by the input impedance of the next-stage circuit to which the upper-side peak voltage is supplied.

It may be noted that the lower-side peak voltage can be detected by use of a circuit configuration similar to that of FIG. 8. To achieve this, one end of the capacitive element 56 is connected to the HIGH-side power supply potential rather than to the ground potential, and the direction of the diode 53 is reversed from that of FIG. 8 such that the cathode is connected to the input node. Further, the capacitive element 56 is not coupled to the ground potential but coupled to the HIGH-side power supply potential at the time of reset.

Figure 9:
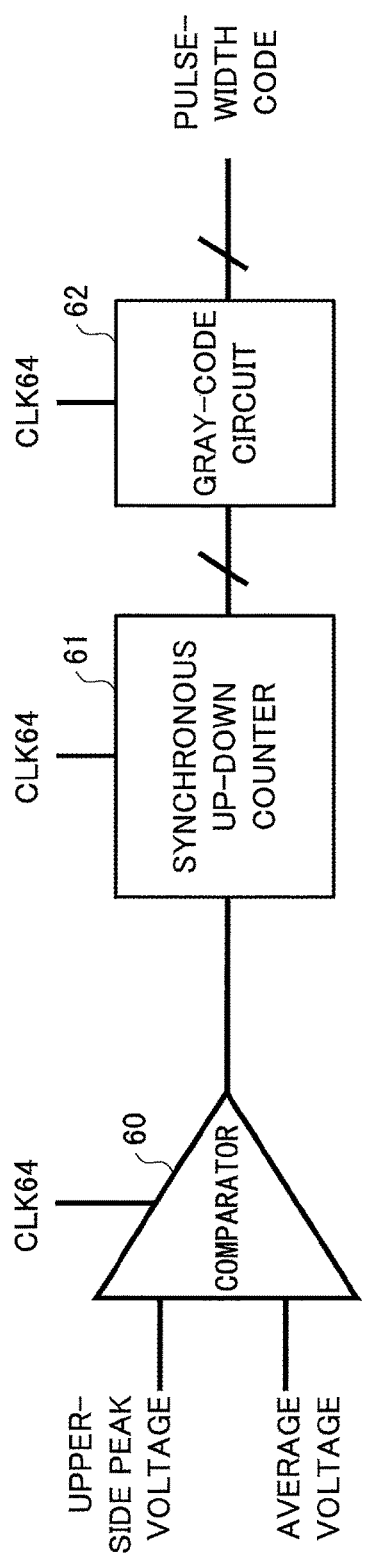
FIG. 9 is a drawing illustrating an example of the configuration of a pulse-width setting circuit that is part of the pulse generating circuit.
Figure 10:
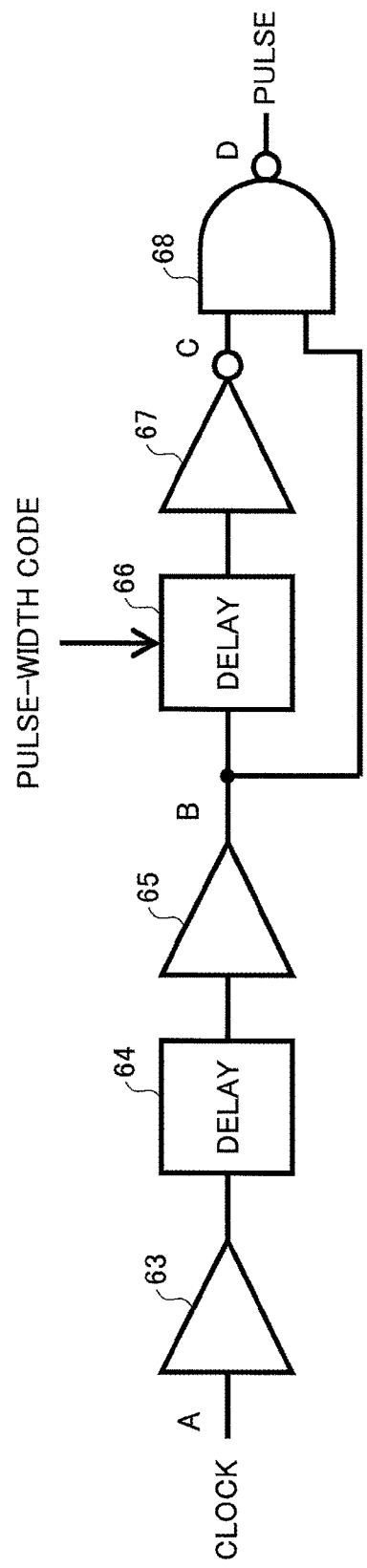
FIG. 10 is a drawing illustrating an example of the configuration of a pulse-signal generating circuit that is part of the pulse generating circuit.

FIG. 9 is a drawing illustrating an example of the configuration of a pulse-width setting circuit that is part of the pulse generating circuit 11. FIG. 10 is a drawing illustrating an example of the configuration of a pulse-signal generating circuit that is part of the pulse generating circuit 11.

The pulse-width setting circuit illustrated in FIG. 9 includes a comparator 60, a synchronous up-down counter 61, and a gray-code circuit 62. The comparator 60 receives the upper-side peak voltage form the peak-voltage monitor circuit 10B and the average voltage from the average-voltage monitor circuit 10A. It may be noted that a margin voltage $\Delta V$ is added to the comparator 60. That is, the comparator 60 outputs HIGH when the upper-side peak voltage is higher than the average voltage plus the margin voltage $\Delta V$, and outputs LOW when the upper-side peak voltage is lower than the average voltage plus the margin voltage $\Delta V$.

When the output of the comparator 60 is HIGH, the synchronous up-down counter 61 counts down in synchronization with a frequency-divided clock CLK64 whose frequency is 1/64 of the frequency of the clock signal. The synchronous up-down counter 61 counts up in synchronization with the frequency-divided clock CLK64 when the output of the comparator 60 is LOW. The comparator 60 may be a synchronous comparator that operates based on the frequency-divided clock CLK64 serving as a trigger.

The gray-code circuit 62 that operates in synchronization with the frequency-divided clock CLK64 converts into a gray code the count that is output from the synchronous up-down counter 61. The obtained gray code is supplied as a pulse-width code to the pulse-signal generating circuit illustrated in FIG. 10. In this manner, the pulse-width code is updated once in 64 cycles of the clock signal. It may be noted that the frequency-divided clock CLK64 is generated by the timing generating circuit 14 illustrated in FIG. 1.

The pulse-signal generating circuit illustrated in FIG. 10 includes a buffer 63, a delay circuit 64, a buffer 65, a delay circuit 66, an inverter 67, and a NAND gate 68. The delay circuit 64 delays a clock signal A that is input. A signal C is obtained by inverting, with the inverter 67, a signal that is obtained by delaying a delayed clock signal B with the delay circuit 66. The NAND gate 68 receives the delayed clock signal B and the signal C to generate a LOW-pulse signal D having the pulse width thereof equal to the delay time of the delay circuit 66. The delay circuit 66 is a variable delay circuit that imposes a delay whose time length is responsive to the pulse-width code supplied from the gray-code circuit 62 of FIG. 9.

Figure 11:
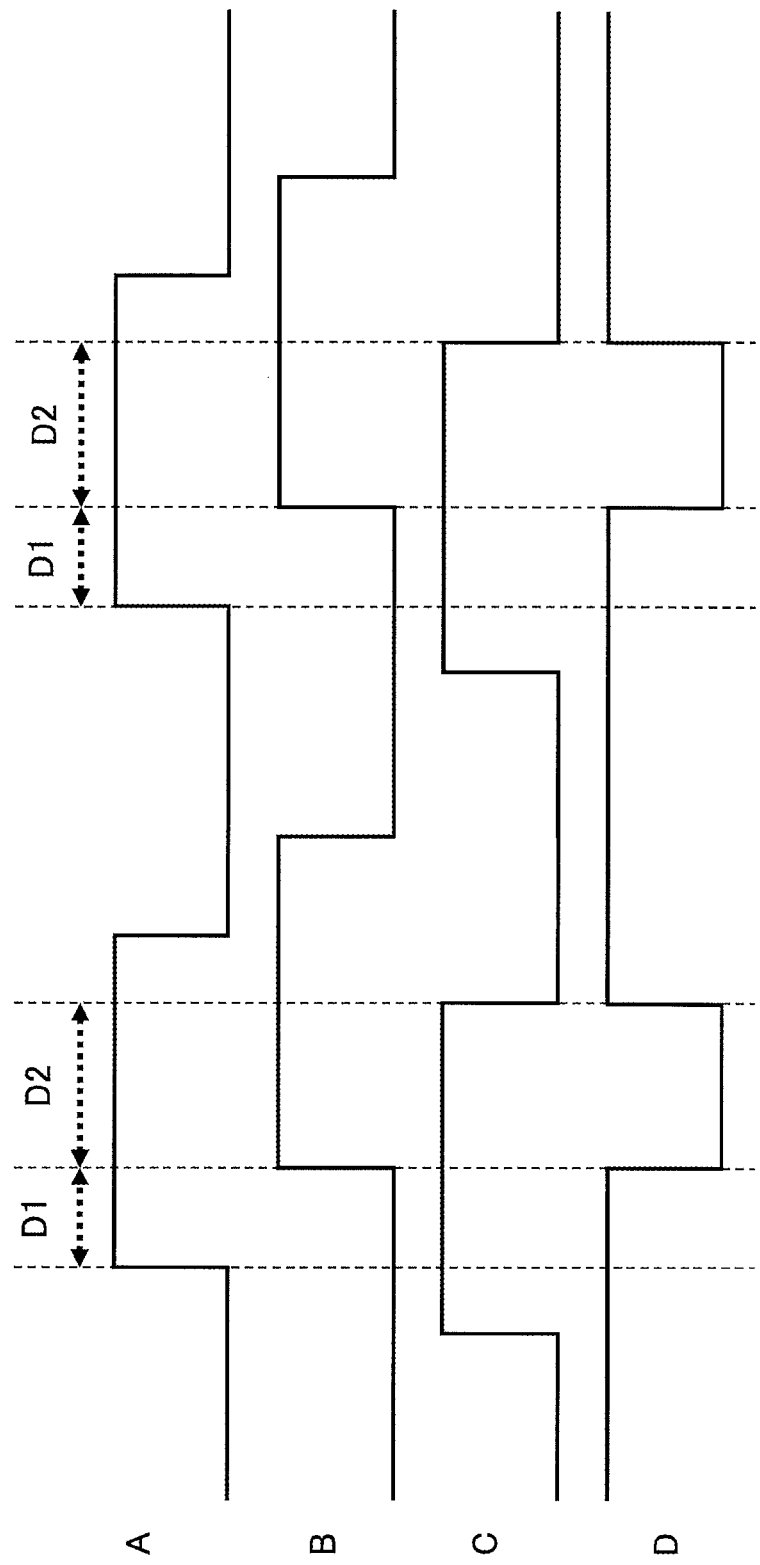
FIG. 11 is a drawing illustrating signal waveforms of the pulse-signal generating circuit illustrated in FIG. 10.

FIG. 11 is a drawing illustrating signal waveforms of the pulse-signal generating circuit illustrated in FIG. 10. As illustrated in FIG. 11, the clock signal A is delayed by a delay time D1 of the delay circuit 64 to become the delayed clock signal B. The delayed clock signal B is delayed by a delay time D2 of the delay circuit 66 and then inverted to produce the signal C. A NAND operation is then performed between the delayed clock signal B and the signal C to produce a LOW-pulse signal D having the pulse width thereof equal to the delay time D2. This LOW-pulse signal D is in synchronization with the clock signal A with some delay. The LOW-pulse signal D is applied to the gate of the PMOS transistor 47 of the pulse generating circuit 11 illustrated in FIG. 5.

In the circuit illustrated in FIG. 9, the synchronous up-down counter 61 counts down when the output of the comparator 60 is HIGH, thereby shortening the pulse width specified by the pulse-width code. The synchronous up-down counter 61 counts up when the output of the comparator 60 is LOW, thereby elongating the pulse width specified by the pulse-width code. Further, the circuit illustrated in FIG. 10 generates a LOW-pulse signal having the pulse width thereof specified by the pulse-width code. With the pulse generating circuit 11 having such a configuration, a pulse signal is generated whose pulse width is decreased when the upper-side peak voltage is higher than the average voltage plus the margin $\Delta V$, and is increased otherwise.

Figure 12:
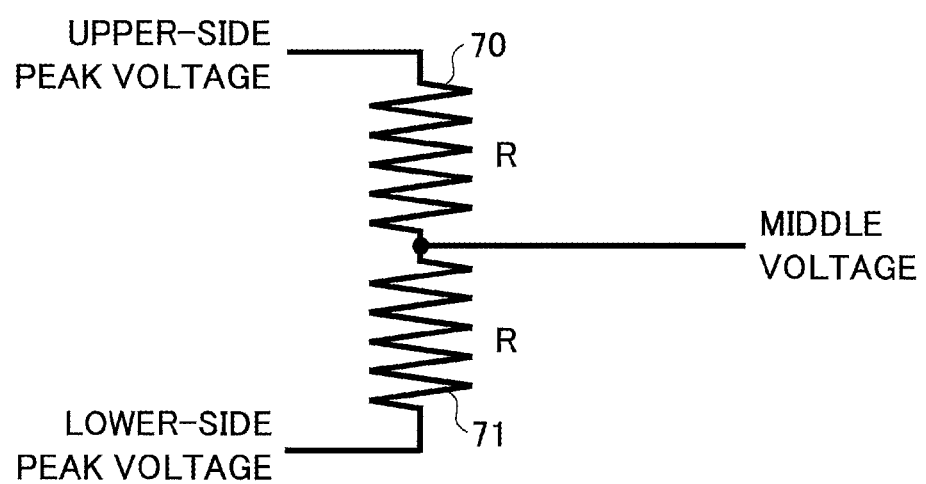
FIG. 12 is a drawing illustrating an example of the configuration of a middle-voltage generating circuit that is part of the current-amount adjusting circuit.
Figure 13:
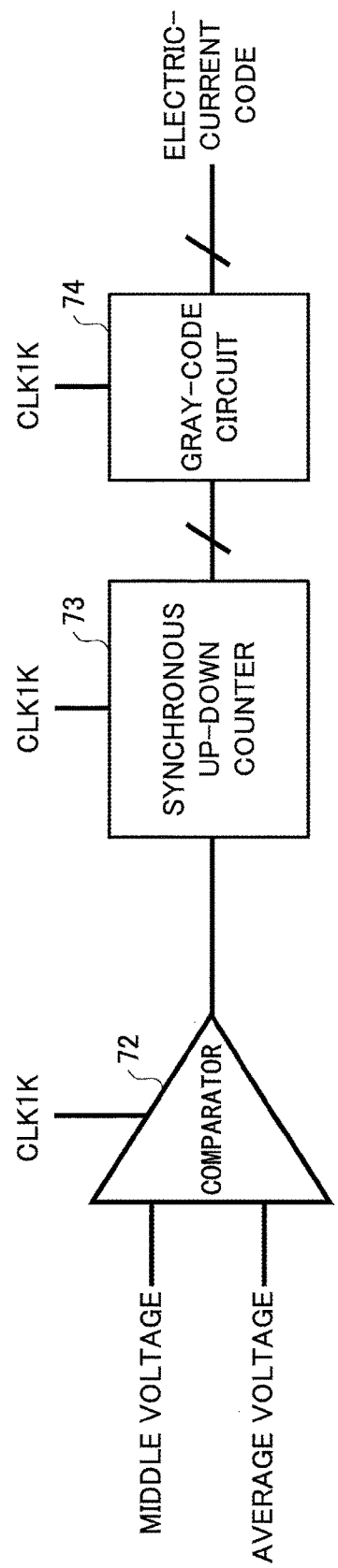
FIG. 13 is a drawing illustrating an example of the configuration of an electric-current-code generating circuit that is part of the current-amount adjusting circuit.

FIG. 12 is a drawing illustrating an example of the configuration of a middle-voltage generating circuit that is part of the current-amount adjusting circuit 12. FIG. 13 is a drawing illustrating an example of the configuration of an electric-current-code generating circuit that is part of the current-amount adjusting circuit 12.

The middle-voltage generating circuit illustrated in FIG. 12 includes resistive elements 70 and 71. The resistive elements 70 and 71 are series-connected to each other, and have the same resistance value R. With the upper-side peak voltage being applied to one end of the series-connected resistive elements 70 and 71 and the lower-side peak voltage being applied to the opposite end thereof, the connection point between resistive elements 70 and 71 has a middle voltage between the upper-side peak voltage and the lower-side peak voltage.

The electric-current-code generating circuit illustrated in FIG. 13 includes a comparator 72, a synchronous up-down counter 73, and a gray-code circuit 74. The comparator 72 receives the middle voltage from the middle-voltage generating circuit of FIG. 12 and the average voltage from the average-voltage monitor circuit 10A. The comparator 72 outputs HIGH when the middle voltage is higher than the average voltage, and outputs LOW when the middle voltage is lower than the average voltage.

When the output of the comparator 72 is HIGH, the synchronous up-down counter 73 counts down in synchronization with a frequency-divided clock CLK1K whose frequency is 1/1024 of the frequency of the clock signal. The synchronous up-down counter 73 counts up in synchronization with the frequency-divided clock CLK1K when the output of the comparator 72 is LOW. The comparator 72 may be a synchronous comparator that operates based on the frequency-divided clock CLK1K serving as a trigger.

The gray-code circuit 74 that operates in synchronization with the frequency-divided clock CLK1K converts into a gray code the count that is output from the synchronous up-down counter 73. The obtained gray code is supplied to the electric-charge supply circuit 13 illustrated in FIG. 5 as an N-bit electric-current code. In this manner, the electric-current code is updated once in 1024 cycles of the clock signal. It may be noted that the frequency-divided clock CLK1K is generated by the timing generating circuit 14 illustrated in FIG. 1.

In the circuit illustrated in FIG. 13, the synchronous up-down counter 73 counts down when the output of the comparator 72 is HIGH, thereby decreasing the electric-current amount specified by the electric-current code. The synchronous up-down counter 73 counts up when the output of the comparator 72 is LOW, thereby increasing the electric-current amount specified by the electric-current code. The electric-charge supply circuit 13 illustrated in FIG. 5 generates an electric current whose amount is specified by the electric-current code adjusted in the manner as described above. With this arrangement, a proper amount of electric-charge supply is achieved.

The electric-current-code generating circuit illustrated in FIG. 13 operates in synchronization with the 1/1024-frequency-divided clock, and updates the amount of electric current once in 1024 cycles of the original clock signal. The pulse-width setting circuit illustrated in FIG. 9 operates in synchronization with the 1/64-frequency-divided clock, and updates the pulse width once in 64 cycles of the original clock signal. In this manner, the amount of electric current and the pulse width are updated based on feedback control having respective, different updating cycles. In this example, the pulse width is controlled in a relatively short cycle, and the amount of electric current is controlled in a relatively long cycle. Conversely, the pulse width may be controlled in a relatively long cycle, and the amount of electric current may be controlled in a relatively short cycle. With the feedback control systems using respective, different updating cycles, one parameter sufficiently converges first, and, then, the other parameter is made to converge. Such an arrangement achieves stable control.

Figure 14:
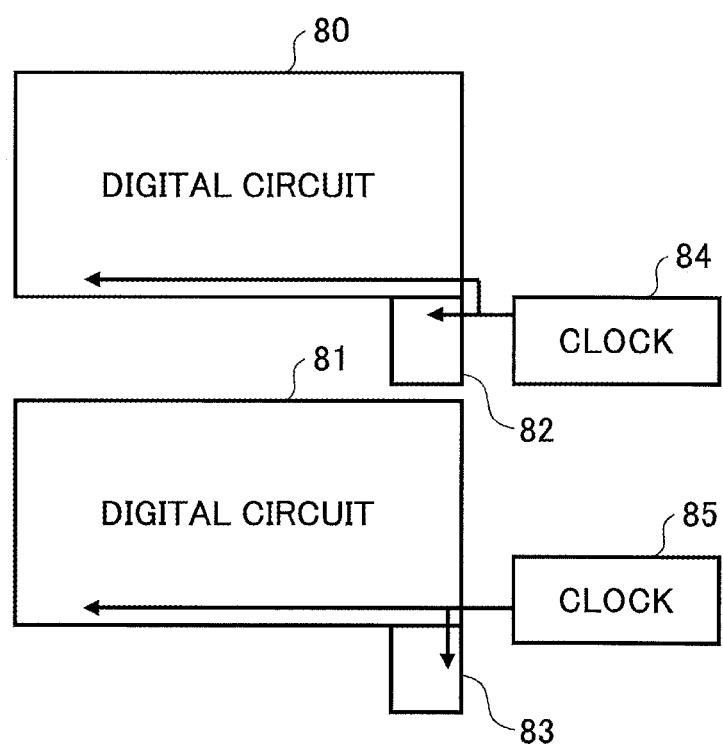
FIG. 14 is a drawing illustrating an example of the arrangement of the power-supply-voltage monitor circuit, the pulse generating circuit, the current-amount adjusting circuit, the electric-charge supply circuit, and the timing generating circuit illustrated in FIG. 1.

FIG. 14 is a drawing illustrating an example of the arrangement of the power-supply-voltage monitor circuit 10, the pulse generating circuit 11, the current-amount adjusting circuit 12, the electric-charge supply circuit 13, and the timing generating circuit 14 (all of which will hereinafter be referred to as an IR-drop reduction circuit) illustrated in FIG. 1. As illustrated in FIG. 14, an IR-drop reduction circuit 82 (especially the pulse generating circuit 11 that generates pulses based on a clock signal) may be situated in the close proximity of a digital circuit 80, and may receive a clock signal directly from a clock source 84. Alternatively, an IR-drop reduction circuit 83 (especially the pulse generating circuit 11 that generates pulses based on a clock signal) may be situated in the close proximity of a digital circuit 81, and may receive a clock signal from part of a clock signal line of the digital circuit 81 which part is close to the IR-drop reduction circuit 83. With such an arrangement, the time at which the electric-charge supply circuit 13 starts to supply electric charge (i.e., the rising transition of the pulse generated by the pulse generating circuit 11) can easily be aligned with the start of an IR drop. It may be noted that the delay circuit 64 illustrated in FIG. 10 with an appropriate delay time for such timing alignment may be selected at the time of circuit design Further, as illustrated in FIG. 14, there may be a plurality of domains corresponding to respective clock signals that have different frequencies, including a domain in which the clock of the clock source 84 is used and a domain in which the clock of the clock source 85 is used. In such a case, the separate IR-drop reduction circuits 82 and 83 may be provided in the respective domains.

Figure 15:
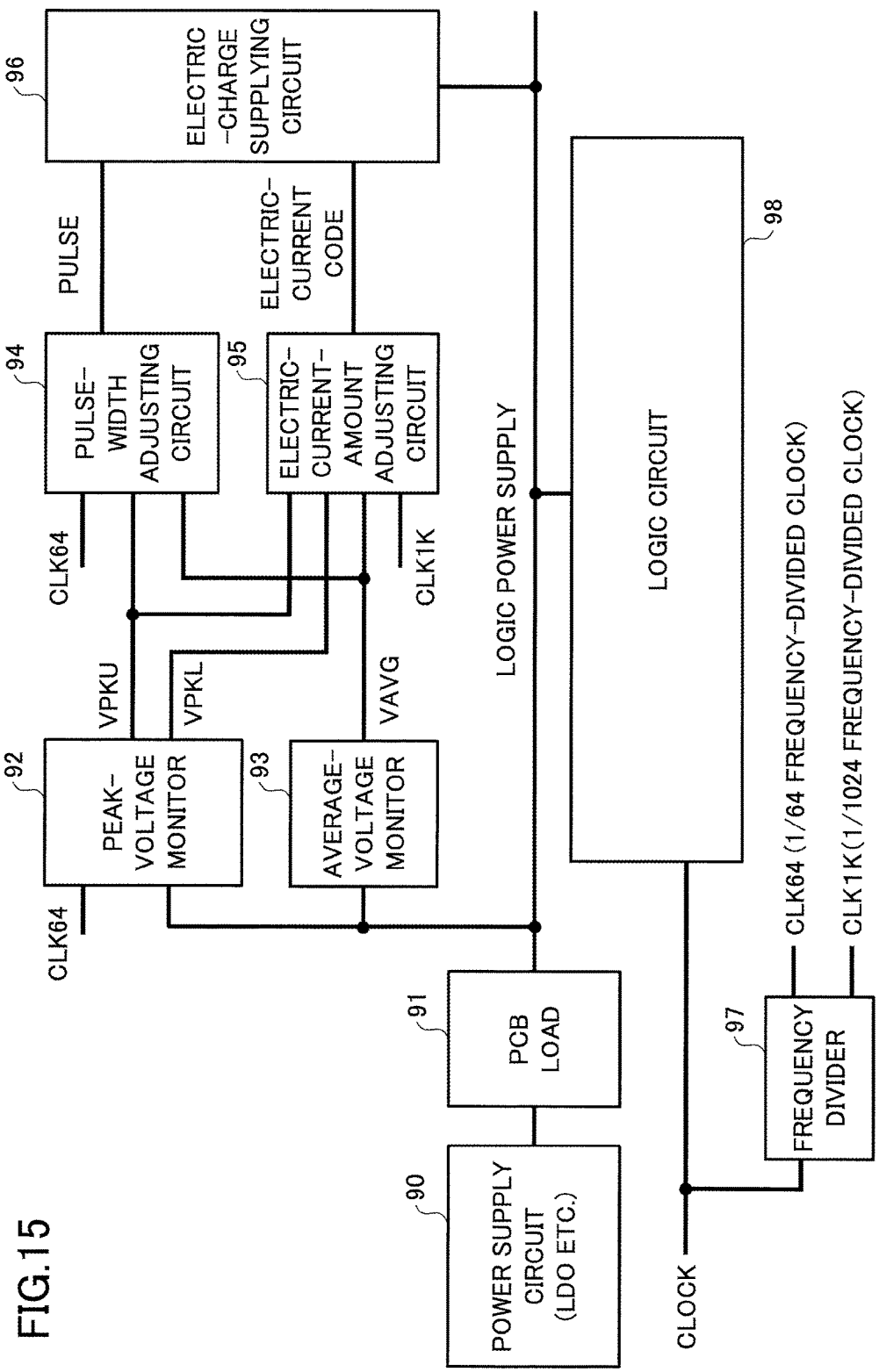
FIG. 15 is a drawing illustrating the configuration of an LSI circuit used in computer simulation that is conducted to check an IR-drop reduction effect of the semiconductor integrated circuit illustrated in FIG. 1.

FIG. 15 is a drawing illustrating the configuration of an LSI circuit used in computer simulation that is conducted to check an IR-drop reduction effect of the semiconductor integrated circuit illustrated in FIG. 1. The LSI circuit illustrated in FIG. 15 includes a power supply circuit 90, a PCB (printed circuit board) load 91, a peak-voltage monitor 92, an average-voltage monitor 93, a pulse-width adjusting circuit 94, an electric-current-amount adjusting circuit 95, an electric-charge supplying circuit 96, a frequency divider 97, and a logic circuit 98. The peak-voltage monitor 92, the average-voltage monitor 93, the pulse-width adjusting circuit 94, the electric-current-amount adjusting circuit 95, and the electric-charge supplying circuit 96 correspond to the peak-voltage monitor circuit 10B, the average-voltage monitor circuit 10A, the pulse generating circuit 11, the current-amount adjusting circuit 12, and the electric-charge supply circuit 13 illustrated in FIG. 1, respectively. The PCB (printed circuit board) load 91 represent the load components (i.e., resistance, inductance, capacitance, etc.) of the power supply lines including the power supply lines on the circuit board on which the LSI is mounted. The logic circuit 98 corresponds to the digital circuit 5 illustrated in FIG. 1. The frequency divider 97 corresponds to the timing generating circuit 14 illustrated in FIG. 1. The frequency divider 97 generates the $1/64$-frequency-divided clock signal CLK64 and the $1/1024$-frequency-divided clock signal CLK1K based on the clock signal. The $1/64$-frequency-divided clock signal CLK64 is supplied to the peak-voltage monitor 92 and the pulse-width adjusting circuit 94.

The peak-voltage monitor 92 generates an upper-side peak voltage VPKU and a lower-side peak voltage VPKL. The average-voltage monitor 93 generates an average voltage VAVG. Based on the upper-side peak voltage VPKU and the lower-side peak voltage VPKL, the pulse-width adjusting circuit 94 generates a pulse having a desired pulse width in the same manner as the pulse generating circuit 11 previously described. The electric-current-amount adjusting circuit 95 generates an electric-current code in the same manner as the current-amount adjusting circuit 12 previously described based on the upper-side peak voltage VPKU, the lower-side peak voltage VPKL and the average voltage VAVG.

Figure 16A:
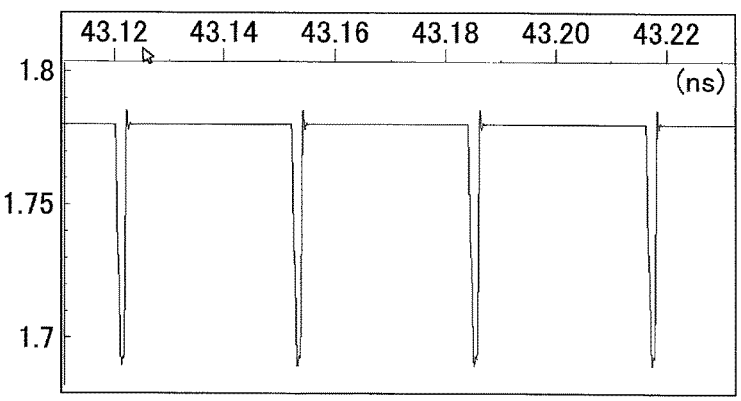
FIGS. 16A through 16D are drawings illustrating the results of simulating the operations of the semiconductor integrated circuit illustrated in FIG. 15.
Figure 16B:
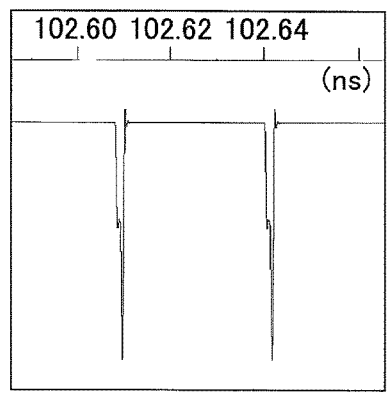
Figure 16C:
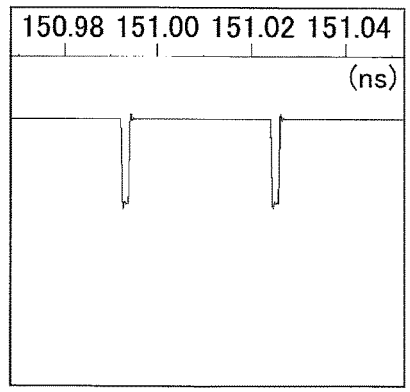
Figure 16D:
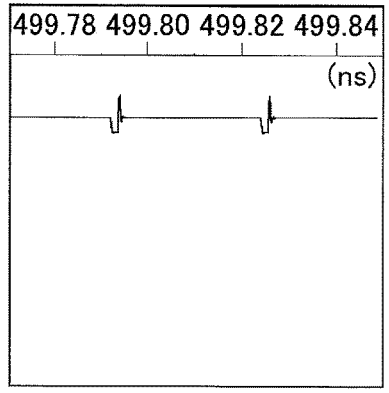

FIGS. 16A through 16D are drawings illustrating the results of simulating the operations of the semiconductor integrated circuit illustrated in FIG. 15. In FIGS. 16A through 16D, the horizontal axis represent time, and the vertical axis represent the power supply voltage that is applied to the logic circuit 98. FIG. 16A illustrates an initial state in which no electric charge is supplied. A voltage change of 100 mV from the upper-side peak to the lower-side peak is observed. FIG. 16B illustrates a state in which pulse-width adjustment is ongoing. A waveform similar to the voltage waveform 33 illustrated in FIG. 3A is observed. FIG. 16C illustrates a state in which pulse-width adjustment is completed. A waveform similar to the voltage waveform 36 illustrated in FIG. 3B is observed. FIG. 16D illustrates a state in which adjustment of electric-current amount is completed. A waveform similar to the voltage waveform illustrated in FIG. 4B is observed, in which IR drops are substantially eliminated (15 mV peak to peak). These simulation results indicate that the IR-drop reduction function of the semiconductor integrated circuit illustrated in FIG. 1 is extremely effective.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A semiconductor integrated circuit, comprising:
   a digital circuit configured to receive a first power supply having a first voltage to operate in synchronization with a clock signal; and
   an electric-charge supplying circuit configured to supply electric charge from a second power supply having a second voltage to the digital circuit in synchronization with the clock signal, the second voltage being higher than the first voltage.

2. The semiconductor integrated circuit as claimed in claim 1, further comprising a power supply line configured to supply the first power supply to the digital circuit and to supply the electric charge from the second power supply to the digital circuit, wherein the electric-charge supply circuit supplies a certain amount of electric current from the second power supply to the digital circuit in synchronization with the clock signal for a duration of a certain time length, the certain amount and the certain time length being adjusted based on results of detecting a fluctuation of the voltage of the power supply line.

3. The semiconductor integrated circuit as claimed in claim 2, further comprising:
   a power-supply-voltage monitor circuit configured to output the results of detecting a fluctuation of the voltage of the power supply line;
   an electric-current-amount adjusting circuit configured to generate a signal having a signal value that varies in response to the results output from the power-supply-voltage monitor circuit; and
   a pulse generating circuit configured to generate, in synchronization with the clock signal, a pulse having a pulse width that varies in response to the results output from the power-supply-voltage monitor circuit,
   wherein the electric-charge supply circuit is configured to supply the electric current, the certain amount of which is responsive to the signal value, to the digital circuit from the second power supply for the duration of the certain time length responsive to the pulse width, based on the signal from the electric-current-amount adjusting circuit and the pulse from the pulse generating circuit.

4. The semiconductor integrated circuit as claimed in claim 3, wherein the results output from the power-supply-voltage monitor circuit include an upper-side peak voltage of the voltage of the power supply line, a lower-side peak voltage of the voltage of the power supply line, and an average voltage of the voltage of the power supply line.

5. The semiconductor integrated circuit as claimed in claim 4, wherein the pulse generating circuit is configured to change the pulse width of the pulse in response to a difference between the upper-side peak voltage and the average voltage.

6. The semiconductor integrated circuit as claimed in claim 4, wherein the electric-current-amount adjusting circuit is configured to change the signal value of the signal in response to a high or low relationship between the average voltage and a middle voltage between the upper-side peak voltage and the lower-side peak voltage.

7. The semiconductor integrated circuit as claimed in claim 3, wherein the pulse generating circuit is situated in a close proximity of the digital circuit and configured to receive the clock signal directly from a clock source or from part of a clock signal line of the digital circuit which part is close to the clock source.

8. The semiconductor integrated circuit as claimed in claim 1, further comprising an analog circuit.

9. A method of controlling power supply for a semiconductor integrated circuit, comprising:
   causing a digital circuit receiving a first power supply having a first voltage to operate in synchronization with a clock signal; and
   supplying electric charge from a second power supply having a second voltage to the digital circuit in synchronization with the clock signal, the second voltage being higher than the first voltage.

10. The method as claimed in claim 9, wherein the supplying the electric charge supplies a certain amount of electric current from the second power supply to the digital circuit in synchronization with the clock signal for a duration of a certain time length,
   the method further comprising:
   detecting a voltage fluctuation of a power supply line configured to supply the first power supply to the digital circuit and to supply the electric charge from the second power supply to the digital circuit; and
   adjusting the certain amount and the certain time length based on results of detecting the voltage fluctuation.

* * * * *